United States Patent
Guan et al.

(10) Patent No.: US 12,119,446 B2
(45) Date of Patent: Oct. 15, 2024

(54) ELECTROLYTE AND ELECTROCHEMICAL DEVICE

(71) Applicant: NINGDE AMPEREX TECHNOLOGY LIMITED, Ningde (CN)

(72) Inventors: Mingming Guan, Ningde (CN); Yali Xiong, Ningde (CN); Jianming Zheng, Ningde (CN); Jianyu Liu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 927 days.

(21) Appl. No.: 17/054,053

(22) PCT Filed: Mar. 31, 2020

(86) PCT No.: PCT/CN2020/082574
§ 371 (c)(1),
(2) Date: Nov. 9, 2020

(87) PCT Pub. No.: WO2021/196019
PCT Pub. Date: Oct. 7, 2021

(65) Prior Publication Data
US 2023/0104300 A1    Apr. 6, 2023

(51) Int. Cl.
| H01M 10/0566 | (2010.01) |
| H01M 10/0525 | (2010.01) |
| H01M 10/0567 | (2010.01) |
| H01M 10/0568 | (2010.01) |
| H01M 10/0569 | (2010.01) |

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0525; H01M 10/0569; H01M 10/05; H01M 10/052; H01M 10/0568; H01M 10/0566; H01M 10/056; H01M 10/4235; H01M 10/08; H01M 2300/0017; H01M 2300/0025; H01M 2300/0028; H01M 2300/0034; Y02E 60/10
See application file for complete search history.

(56) References Cited

FOREIGN PATENT DOCUMENTS

| CN | 101640290 A | 2/2010 |
| CN | 102324565 A | 1/2012 |
| CN | 105914401 A | 8/2016 |
| CN | 106207258 A | 12/2016 |
| CN | 107946636 A | 4/2018 |
| CN | 109687022 A | 4/2019 |
| CN | 109980225 A | 7/2019 |
| CN | 110165219 A | 8/2019 |
| CN | 110190332 A | 8/2019 |
| JP | H0765863 A | 3/1995 |

OTHER PUBLICATIONS

Machine translation of JPH-0765863 A, 18 pages. (Year: 1995).*
Machine translation of CN101640290 A, 28 pages. (Year: 2010).*
(Continued)

*Primary Examiner* — Matthew E. Hoban
*Assistant Examiner* — Lynne Edmondson
(74) *Attorney, Agent, or Firm* — XSENSUS LLP

(57) ABSTRACT

An electrolyte, comprising a compound of Formula I and an additive A,

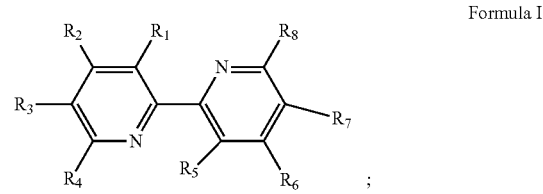

Formula I $R_1$, $R_2$, $R_3$, $R_4$, $R_5$, $R_6$, $R_7$ and $R_8$ are each independently selected from: hydrogen, halo, —COOX, substituted or unsubstituted $C_{1-8}$alkyl, substituted or unsubstituted $C_{2-10}$alkenyl, substituted or unsubstituted $C_{2-10}$alkynyl, substituted or unsubstituted $C_{1-8}$alkoxy, or —$R^a$—S(=O)$_2$—$R^b$, wherein $R^a$ is selected from substituted or unsubstituted $C_{1-8}$alkylene, $R^b$ is selected from halo or substituted or unsubstituted $C_{1-8}$alkyl, and at least one of $R_1$, $R_2$, $R_3$, $R_4$, $R_5$, $R_6$, $R_7$ and $R_8$ is —COOX. When substituted, the substituent is selected from cyano or halo; and X is selected from Li$^+$, Na$^+$, K$^+$ or Rb$^+$. The additive A is at least one selected from fluoroethylene carbonate, LiPO$_2$F$_2$, or vinylene carbonate.

18 Claims, No Drawings

(56) References Cited

OTHER PUBLICATIONS

Liu et al., "Effects of the LiPO2F2 additive on unwanted lithium plating in lithium-ion cells", Electrochimica Acta, 263, pp. 237-248. (Year: 2018).*
PCT International Search Report mailed Dec. 28, 2020 in counterpart PCT application PCT/CN2020/082574, 5 pages in Chinese.
PCT Written Opinion mailed Dec. 28, 2020 in counterpart PCT application PCT/CN2020/082574, 3 pages in Chinese.
Chinese Second Office Action mailed Apr. 13, 2022 in counterpart Chinese application 202080003789.X, 8 pages in Chinese.
"LiPF6 stabilizer and transition metal cation scavenger: a bifunctional bipyridine-based ligand for lithium ion batteries application," Jia et al., Chemistry of Materials, May 8, 2019, 26 pages.
Chinese First Office Action mailed Nov. 17, 2021 in counterpart Chinese application 202080003789.X, 9 pages in Chinese.
"LiPF6 Stabilizer and Transition-Metal Cation Scavenger: A Bifunctional Bipyridine-Based Ligand for Lithium-ion Battery Application", Jia et al., Chemistry of Materials (2019), vol. 31, pp. 4025-4033.

* cited by examiner

ELECTROLYTE AND ELECTROCHEMICAL DEVICE

CROSS REFERENCE TO THE RELATED APPLICATIONS

The present application is a National Stage application of PCT international application: PCT/CN2020/082574, filed on 31 Mar. 2020, the disclosure of which is hereby incorporated by reference in its entirety.

TECHNICAL FIELD

The present application relates to the technical field of energy storage technologies, and more particularly to an electrolyte and an electrochemical device containing the electrolyte.

BACKGROUND

Lithium-ion batteries are known to have many desired properties, such as high energy density, long service life, and being free of memory effect. As such, lithium-ion batteries have received great attention and are widely used in smart products (including mobile phones, notebooks, cameras and other electronic products), power tools and electric vehicles; and are gradually replacing the traditional Ni—Cd, and MH-Ni batteries. However, with the rapid development of technologies and the diversification of usage scenarios, the rapid decline in capacity of lithium-ion batteries at low temperatures has become a pain point for users.

In order to improve the cycle performance of lithium-ion batteries, a common strategy is to use an additive capable of forming a film on the positive electrode and negative electrode. However, high-impedance film-forming additives often result in severe loss of low-temperature performance and significantly increase the impedance of batteries. In order to improve low-temperature performance of lithium-ion batteries, a common method is to improve kinetics of electrolyte. However, high-kinetic electrolytes tend to seriously deteriorate high-temperature cycle and high-temperature storage performance of batteries. Therefore, how to develop lithium ion batteries with excellent performance has become an urgent problem to be solved in the industry.

SUMMARY

To solve the above problems, the present application provides an electrolyte and an electrochemical device. The electrolyte improves high-temperature cycle and storage performances as well as low-temperature performance of the electrochemical device.

An aspect of the present application provides an electrolyte. In some embodiments, the electrolyte includes a compound of Formula I and an additive A,

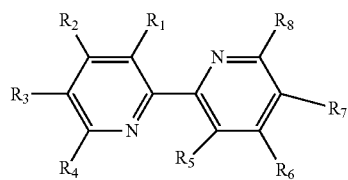

Formula I wherein:
$R_1$, $R_2$, $R_3$, $R_4$, $R_5$, $R_6$, $R_7$ and $R_8$ are each independently selected from: H, halo, —COOX, substituted or unsubstituted $C_{1-8}$ alkyl, substituted or unsubstituted $C_{2-10}$ alkenyl, substituted or unsubstituted $C_{2-10}$ alkynyl, substituted or unsubstituted $C_{1-8}$ alkoxy, or —$R^a$—S($=$O)$_2$—$R^b$, wherein $R^a$ is selected from substituted or unsubstituted $C_{1-8}$ alkylene, $R^b$ is selected from halo or substituted or unsubstituted $C_{1-8}$ alkyl, and at least one of $R_1$, $R_2$, $R_3$, $R_4$, $R_5$, $R_6$, $R_7$ and $R_8$ is —COOX;
wherein when substituted, the substituent is selected from cyano or halo; and
X is selected from Li$^+$, Na$^+$, K$^+$ or Rb$^+$.

The additive A is at least one of fluoroethylene carbonate, LiPO$_2$F$_2$, or vinylene carbonate.

In some embodiments, the compound of Formula I is at least one of:

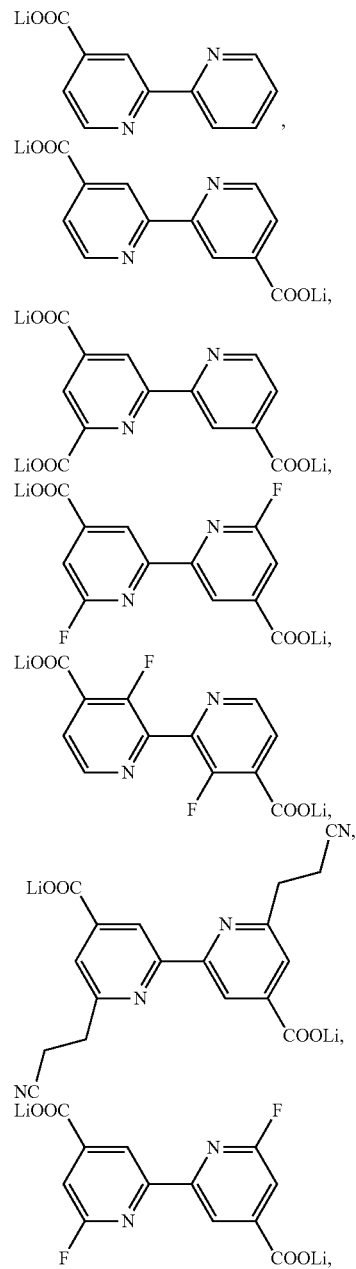

-continued

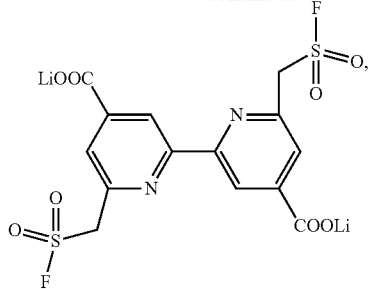

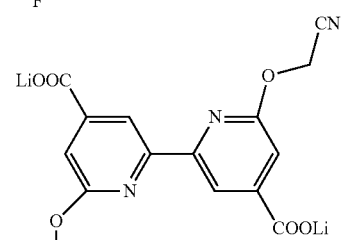

or

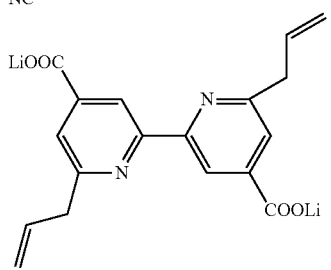

In some embodiments, the weight ratio of the compound of Formula I to the additive A is 30:1 to 1:200.

In some embodiments, the compound of Formula I is 0.05% to 5% based on the total weight of the electrolyte, and the additive A is 0.01% to 16% based on the total weight of the electrolyte.

In some embodiments, the electrolyte further includes the compound of Formula II:

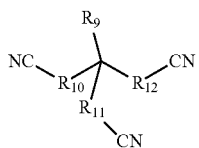

Formula II wherein:

$R_9$ is selected from hydrogen, cyano, halo, substituted or unsubstituted $C_{1-8}$ alkyl, or substituted or unsubstituted $C_{1-8}$ alkoxy;

$R_{10}$, $R_{11}$ and $R_{12}$ are each independently selected from a covalent bond, substituted or unsubstituted $C_{1-8}$ alkylene, or —O—R'—, wherein R' is substituted or unsubstituted $C_{1-8}$ alkylene;

wherein when substituted, the substituent is selected from cyano or halo.

The compound of Formula II is 0.05% to 10% based on the total weight of the electrolyte.

In some embodiments, the compound of Formula II includes at least one of

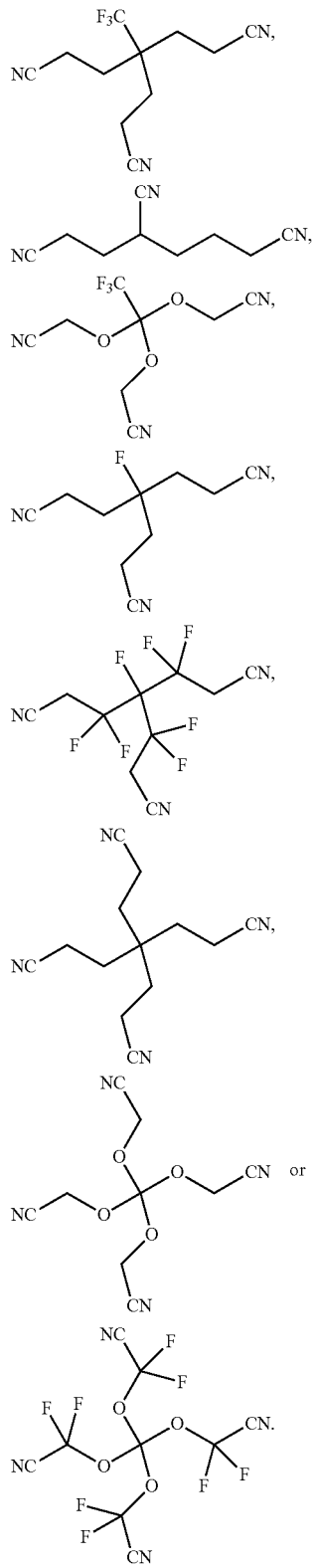

In some embodiments, the electrolyte further includes the compound of Formula III:

Formula III

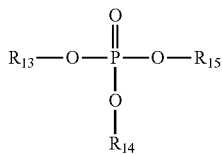

wherein $R_{13}$, $R_{14}$ and $R_{15}$ are each independently selected from substituted or unsubstituted $C_{1-8}$ alkyl, or —$R^c$—$S(=O)_2$—$R^d$, wherein $R^c$ is selected from substituted or unsubstituted $C_{1-8}$ alkylene, and $R^d$ is selected from halo, or substituted or unsubstituted $C_{1-8}$ alkyl, wherein substituted means being substituted with one or more halo.

The compound of Formula III is 0.1% to 20% based on the total weight of the electrolyte.

In some embodiments, the compound of Formula III includes at least one of

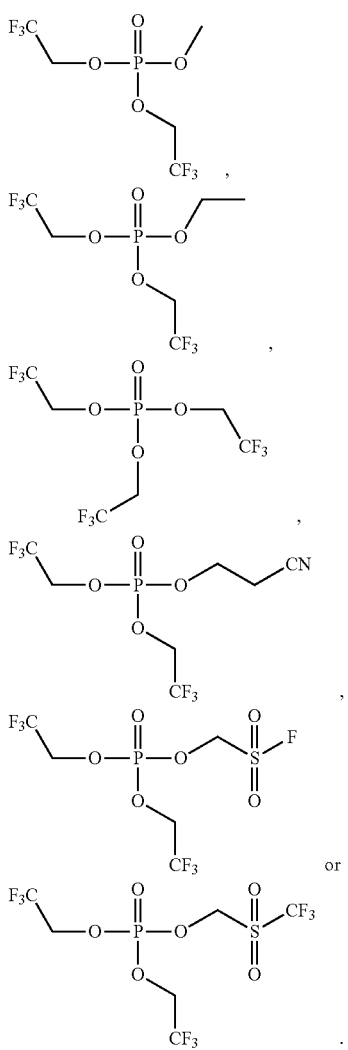

In some embodiments, the electrolyte further includes a compound of Formula IV:

Formula IV

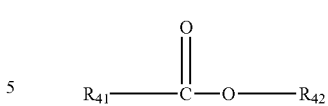

wherein $R_{41}$ and $R_{42}$ are each independently selected from substituted or unsubstituted $C_{1-10}$ alkyl, wherein substituted means being substituted with one or more substituents selected from F, Cl or Br.

In some embodiments, the compound of Formula IV is 5% to 50% based on the total weight of the electrolyte.

In some embodiments, the compound of Formula IV includes at least one of

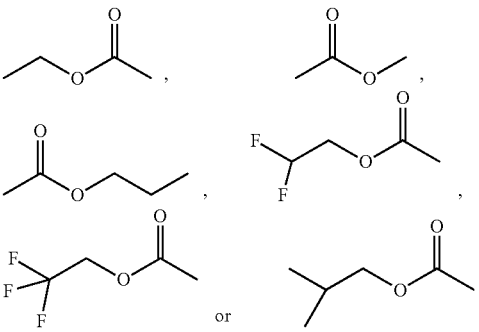

Another aspect of the present application provides an electrochemical device. The electrochemical device includes a positive electrode, a negative electrode, and any electrolyte as described above.

In another aspect, the present application provides an electronic device including any electrochemical device as described above.

Additional aspects and advantages of the embodiments of the present application will be described or shown in the following description or interpreted by implementing the embodiments of the present application.

DETAILED DESCRIPTION

The embodiments of the present application will be described in detail below. The embodiments of the present application should not be interpreted as limitations to the protection scope of the present application. Unless otherwise expressly indicated, the following terms used herein have the meanings indicated below.

As used herein, the term "about" is used to describe and explain minor changes. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or subranges within the ranges, like explicitly specifying each value and each sub-range.

In the detailed description and the claims, a list of items connected by the term "one of" may mean any one of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" or "at least one of A or B" means only A; only B; or A and B. In another example, if items A, B and C are listed, then the phrase "at least one of A, B and C" or "at least one of A, B or C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In the specific embodiment and the claims, in the expression with reference to the number of carbon atoms, i.e. the number after the capital letter "C", such as "$C_3$-$C_{10}$", "$C_3$-$C_{10}$" or the like, the number after "C", for example, "1", "3" or "10", indicate the number of carbon atoms in a specific functional group. That is, the functional groups may include 1-10 carbon atoms and 3-10 carbon atoms, respectively. For example, "$C_1$-$C_4$alkyl" or "$C_{1-4}$ alkyl" means an alkyl group having 1-4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$— or $(CH_3)_3C$—.

As used herein, the term "alkyl group" refers to a linear saturated hydrocarbon structure having 1 to 8 carbon atoms. The alkyl group is also intended to be a branched or cyclic hydrocarbon structure having 3 to 8 carbon atoms. For example, the alkyl group may be an alkyl group having 1 to 6 carbon atoms, or an alkyl group having 1 to 4 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group can be optionally substituted.

The term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains from 2 to 10 carbon atoms, for example an alkenyl group having 2 to 8 carbon atoms, an alkenyl group having 2 to 6 carbon atoms or an alkenyl group having 2 to 4 carbon atoms. Representative alkenyl groups include (for example) ethenyl, n-propenyl, iso-propenyl, n-but-2-enyl, butyl-3-enyl, n-hex-3-enyl, and the like. Additionally, the alkenyl group can be optionally substituted.

The term "alkynyl group" refers to a monovalent unsaturated hydrocarbon group which may be straight or branched and which has at least one and usually 1, 2 or 3 carbon-carbon triple bonds. Unless otherwise defined, the alkynyl group is typically an alkynyl group containing from 2 to 10, from 2 to 8, from 2 to 6, or from 2 to 4 carbon atoms. Representative alkynyl groups include (for example) ethynyl, prop-2-ynyl (n-propynyl), n-but-2-ynyl, n-hex-3-ynyl and the like. Additionally, the alkynyl group can be optionally substituted.

The term "alkylene group" means a linear or branched divalent saturated hydrocarbon group. For example, the alkylene group may be an alkylene group having 1 to 8 carbon atoms, an alkylene group having 1 to 6 carbon atoms, or an alkylene group having 1 to 4 carbon atoms. Representative alkylene group includes (for example) methylene, ethane-1,2-diyl ("ethylene"), propane-1,2-diyl, propane-1,3-diyl, butane-1, 4-diyl, pentane-1,5-diyl and the like. Additionally, the alkylene group can be optionally substituted.

The term "alkoxy group" refers to the alkyl-O— group, and encompasses, for example, an alkoxy group having 1-8 carbon atoms, an alkoxy group having 1-6 carbon atoms, an alkoxy group having 1-4 carbon atoms, or an alkoxy group having 5-8 carbon atoms. Representative examples of alkoxy group include, but are not limited to, methoxy, ethoxy, propoxy, 2-propoxy, butoxy, tert-butoxy, pentyloxy, and hexyloxy. Additionally, the alkoxy group can be optionally substituted.

When the above substituents are substituted, unless otherwise specified, they are substituted with one or more halo.

As used herein, the term "halo" encompasses F, Cl, Br and I, preferably F or Cl.

As used herein, the content of each component in the electrolyte is based on the total weight of the electrolyte.

I. Electrolyte

In some embodiments, the present application provides an electrolyte comprising a compound of Formula I and an additive A:

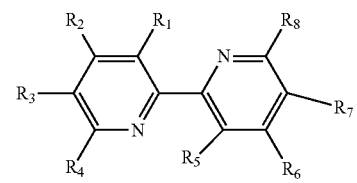

Formula I wherein:

$R_1$, $R_2$, $R_3$, $R_4$, $R_5$, $R_6$, $R_7$ and $R_8$ are each independently selected from: H, halo, —COOX, substituted or unsubstituted $C_{1-8}$ alkyl, substituted or unsubstituted $C_{2-10}$ alkenyl, substituted or unsubstituted $C_{2-10}$ alkynyl, substituted or unsubstituted $C_{1-8}$ alkoxy, or —$R^a$—S(=O)$_2$—$R^b$, wherein $R^a$ is selected from substituted or unsubstituted $C_{1-8}$ alkylene, $R^b$ is selected from halo or substituted or unsubstituted $C_{1-8}$ alkyl, and at least one of $R_1$, $R_2$, $R_3$, $R_4$, $R_5$, $R_6$, $R_7$ and $R_8$ is —COOX;

wherein when substituted, the substituent is selected from cyano or halo; and

X is selected from Li$^+$, Na$^+$, K$^+$ or Rb$^+$.

The additive A is at least one of fluoroethylene carbonate (FEC), lithium difluorophosphate (LiPO$_2$F$_2$) or vinylene carbonate.

In some embodiments, $R_1$ and $R_8$ are each independently selected from: H; halo; —COOX; the following groups that are substituted or unsubstituted: $C_{1-6}$ alkyl or $C_{1-4}$ alkyl, $C_{2-8}$ alkenyl, $C_{2-6}$ alkenyl or $C_{2-4}$ alkenyl, $C_{2-8}$ alkynyl, $C_{2-6}$ alkynyl or $C_{2-4}$ alkynyl, $C_{1-6}$ alkoxy or $C_{1-4}$ alkoxy; or —R$^a$—S(=O)$_2$—R$^b$, wherein R$^a$ is selected from substituted or unsubstituted $C_{1-6}$ alkylene or $C_{1-4}$ alkylene, and R$^b$ is selected from halo or substituted or unsubstituted $C_{1-6}$ alkyl or $C_{1-4}$ alkyl; and at least one of $R_1$, $R_2$, $R_3$, $R_4$, $R_5$, $R_6$, $R_7$ and $R_8$ is —COOX, wherein when substituted, the substituent is selected from cyano or halo; and X is selected from Li$^+$, Na$^+$, K$^+$ or Rb$^+$.

In some embodiments, $R_1$ and $R_8$ are each independently selected from: H; F; —COOX; the following groups that are unsubstituted or substituted with F or cyano: methyl, ethyl, propenyl, or methoxy; or —CH$_2$—S(=O)$_2$—F; and at least one of $R_1$, $R_2$, $R_3$, $R_4$, $R_5$, $R_6$, $R_7$ and $R_8$ is —COOX, wherein X is selected from Li$^+$, Na$^+$, K$^+$ or Rb$^+$.

In some embodiments, Formula I is represented by Formulas I-1 to I-10:

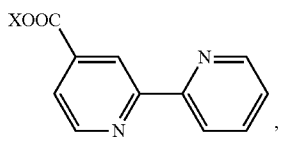

Formula I-1

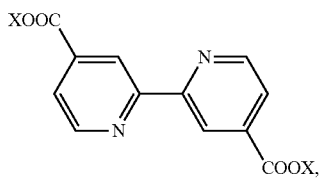

Formula I-2

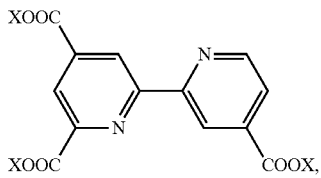

Formula I-3

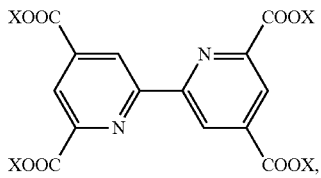

Formula I-4

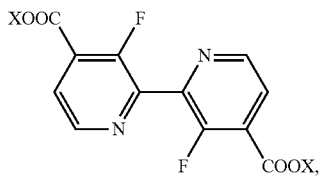

Formula I-5

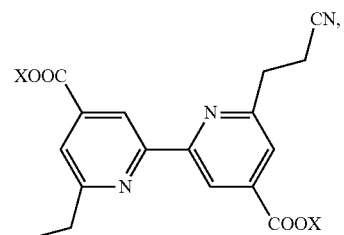

Formula I-6

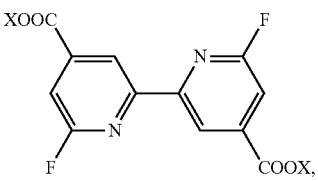

Formula I-7

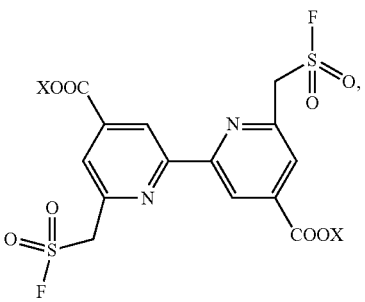

Formula I-8

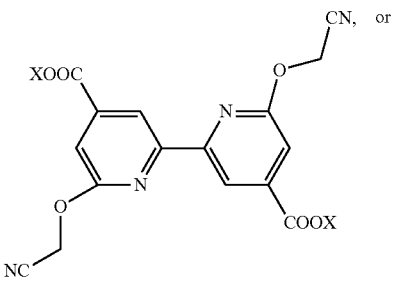

Formula I-9

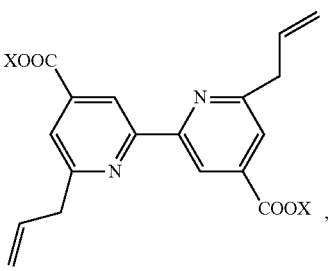

Formula I-10 wherein X is selected from Li$^+$, Na$^+$, K$^+$ or Rb$^+$.

In some embodiments, the compound of Formula I is at least one of:

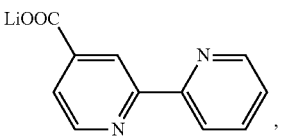

Compound I-1

-continued

Compound I-2

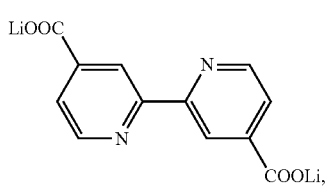

Compound I-3

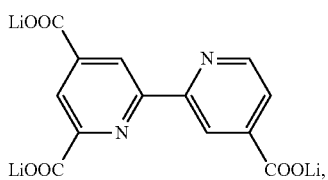

Compound I-4

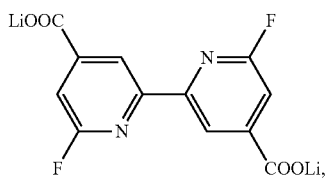

Compound I-5

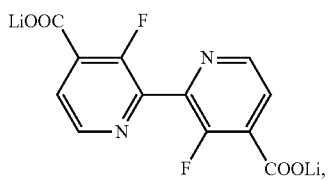

Compound I-6

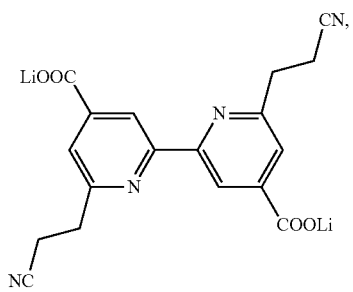

Compound I-7

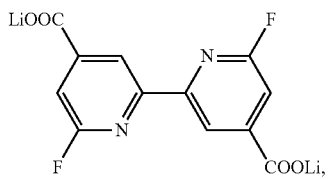

Compound I-8

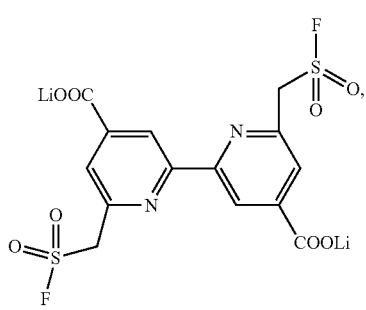

Compound I-9

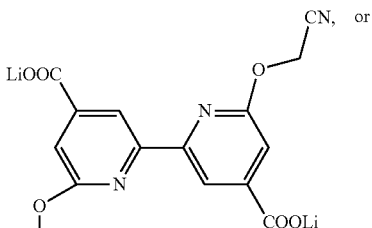

Compound I-10

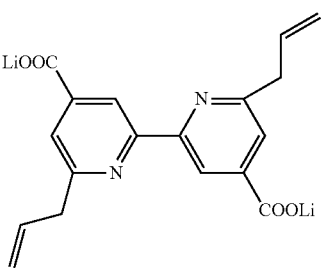

In some embodiments, the weight ratio of the compound of Formula I to the additive A is 30:1 to 1:200.

In some embodiments, the compound of Formula I is 0.05% to 5% based on the total weight of the electrolyte, and the additive A is 0.01% to 16% based on the total weight of the electrolyte.

In some embodiments, the weight ratio of the compound of Formula I to the additive A is 20:1 to 1:150, 10:1 to 1:100, 1:1 to 1:50, or 1:1 to 1:25. In some embodiments, the weight ratio of the compound of Formula I to the additive A is about 15:1, about 10:1, about 5:1, about 3:1, about 2:1, about 1:1, about 1:2, about 1:3, about 1:4, about 1:5, about 1:6, about 1:7, about 1:8, about 1:10, about 1:20, about 1:30, about 1:40, about 1:50, about 1:60, about 1:70, about 1:80, about 1:90, about 1:100, about 1:110, about 1:120, about 1:130, about 1:140, about 1:150, about 1:160, about 1:170, about 1:180, or about 1:190. In some embodiments, the weight ratio of the compound of Formula I to the additive A is about 3:100, about 9:100, about 3:5, about 3:8, about 5:3, about 1:1.5, about 3:50, or about 3:80.

In some embodiments, the compound of Formula I is 0.1% to 3%, 0.1% to 2.5%, or about 0.1% to about 2% based on the total weight of the electrolyte. In some embodiments, the compound of Formula I is about 0.1%, about 0.2%, about 0.3%, about 0.4%, about 0.5%, about 0.6%, about 0.7%, about 0.8%, about 0.9%, about 1%, about 1.2%, about 1.4%, about 1.6%, about 1.8%, about 2%, about 2.2%, about 2.4%, about 2.6%, about 2.8%, about 3%, about 3.5%, about 4% or about 5% based on the total weight of the electrolyte.

In some embodiments, the additive A is 0.05% to 15% or 0.1% to 12% based on the total weight of the electrolyte. In some embodiments, the additive A is about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 10.5%, about 11%, about 11.5%, about 12%, about 12.5%, about 13%, about 13.5%, about 14%, about 14.5%, about 15%, about 15.5%, or about 16% based on the total weight of the electrolyte.

In some embodiments, the electrolyte further includes the compound of Formula II:

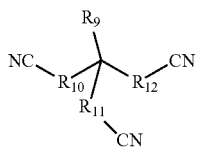

Formula II wherein:
- R₉ is selected from hydrogen, cyano, halo, substituted or unsubstituted $C_{1-8}$ alkyl, or substituted or unsubstituted $C_{1-8}$ alkoxy;
- $R_{10}$, $R_{11}$ and $R_{12}$ are each independently selected from a covalent bond, substituted or unsubstituted $C_{1-8}$ alkylene, or —O—R'—, wherein R' is substituted or unsubstituted $C_{1-8}$ alkylene;
- wherein when substituted, the substituent is selected from cyano or halo.

The compound of Formula II is 0.05% to 10% based on the total weight of the electrolyte.

In some embodiments, R₉ is selected from hydrogen; cyano; halo; or the following groups that are substituted or unsubstituted: $C_{1-6}$ alkyl or $C_{1-4}$ alkyl, or $C_{1-6}$ alkoxy or $C_{1-4}$ alkoxy, wherein when substituted, the substituent is selected from cyano or halo.

In some embodiments, R₉ is selected from hydrogen; cyano; F; and the following groups that are substituted or unsubstituted: methyl, ethyl, propyl, isopropyl, methoxy, ethoxy, propoxy, or isopropoxy, wherein when substituted, they are substituted with one or more substituents selected from cyano and/or F.

In some embodiments, R₉ is selected from —CN, —F, —CF₃, —CH₂CH₂CN, —OCH₂CN, or —OCF₂CN.

In some embodiments, $R_{10}$, $R_{11}$ and $R_{12}$ are each independently selected from a covalent bond, substituted or unsubstituted $C_{1-6}$ alkylene or $C_{1-4}$ alkylene, or —O—R'—, wherein R' is substituted or unsubstituted $C_{1-6}$ alkylene or $C_{1-4}$ alkylene, wherein when substituted, the substituent is selected from cyano and halo.

In some embodiments, $R_{10}$, $R_{11}$ and $R_{12}$ are each independently selected from a covalent bond; the following groups that are unsubstituted or substituted: methylene, ethylene, or propylene; or —O—R'—, wherein R' is selected from the following groups that are unsubstituted or substituted: methylene, ethylene, or propylene; wherein substituted means being substituted with one or more F.

In some embodiments, $R_{10}$, $R_{11}$ and $R_{12}$ are each independently selected from —CH₂—, —CH₂CH₂—, —CF₂CH₂—, —(CH₂)₃—, —OCH₂—, or —OCF₂—.

In some embodiments, the compound of Formula II includes at least one of:

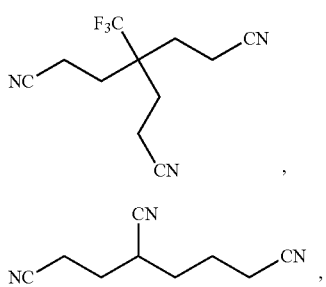

Compound II-1

Compound II-2

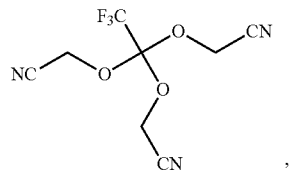

Compound II-3

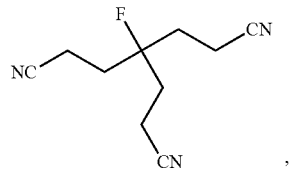

Compound II-4

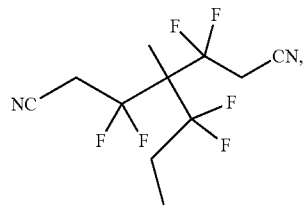

Compound II-5

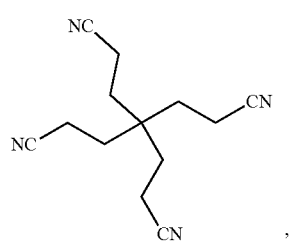

Compound II-6

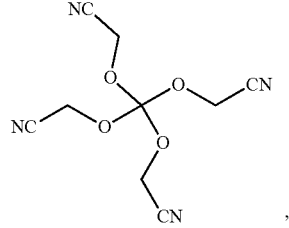

Compound II-7

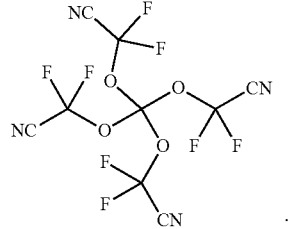

Compound II-8

In some embodiments, the electrolyte further includes the compound of Formula III:

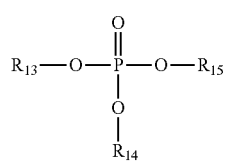

Formula III wherein $R_{13}$, $R_{14}$ and $R_{15}$ are each independently selected from substituted or unsubstituted $C_{1-8}$ alkyl, or —$R^c$—$S(=O)_2$—$R^d$, wherein $R^c$ is selected from substituted or unsubstituted $C_{1-8}$ alkylene, and $R^d$ is selected from halo, or substituted or unsubstituted $C_{1-8}$ alkyl, wherein substituted means being substituted with one or more halo.

The compound of Formula III is about 0.1% to about 20% based on the total weight of the electrolyte.

In some embodiments, $R_{13}$, $R_{14}$ and $R_{15}$ are each independently selected from substituted or unsubstituted $C_{1-6}$ alkyl or $C_{1-4}$ alkyl, or —$R^c$—$S(=O)_2$—$R^d$, wherein $R^c$ is selected from substituted or unsubstituted $C_{1-6}$ alkylene or $C_{1-4}$ alkylene, and $R^d$ is selected from halo and substituted or unsubstituted $C_{1-6}$ alkyl or $C_{1-4}$ alkyl, wherein substituted means being substituted with one or more halo.

In some embodiments, $R_{13}$, $R_{14}$ and $R_{15}$ are each independently selected from the following groups that are substituted or unsubstituted: methyl, ethyl and propyl, or —$R^c$—$S(=O)_2$—$R^d$, wherein $R^c$ is selected from the following groups that are substituted or unsubstituted: methylene, ethylene, and propylene, and $R^d$ is selected from F, and the following groups that are substituted or unsubstituted: methyl, ethyl and propyl, wherein substituted means being substituted with one or more halo.

In some embodiments, $R_{13}$, $R_{14}$ and $R_{15}$ are each independently selected from —$CH_3$, —$CF_3$, —$CH_2CF_3$, —$CH_2CH_3$, —$CH_2CH_2CN$, —$CH_2CH_2F$, —$CH_2$—$S(=O)_2$—F, or —$CH_2$—$S(=O)_2$—$CF_3$.

In some embodiments, the compound of Formula III is about 0.5% to about 15% or about 1% to about 10% based on the total weight of the electrolyte. In some embodiments, the compound of Formula III is about 1%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19% or about 20% based on the total weight of the electrolyte.

In some embodiments, the compound of Formula III includes at least one of

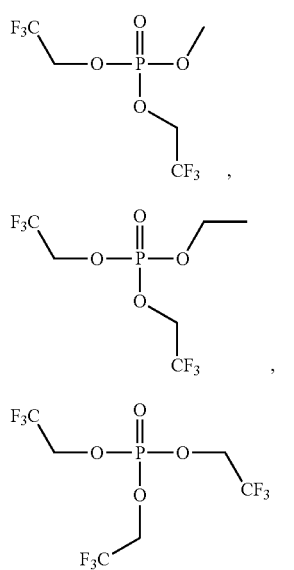

Compound III-1

Compound III-2

Compound III-3

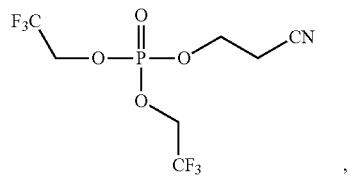

Compound III-4

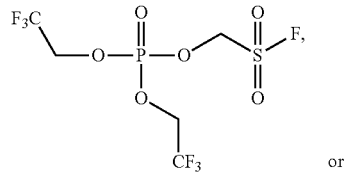

Compound III-5 or

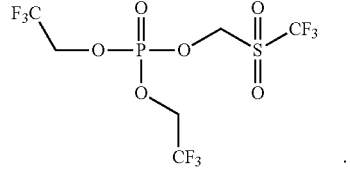

Compound III-6

In some embodiments, the electrolyte further includes a compound of Formula IV:

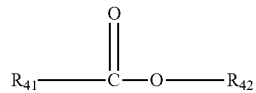

Formula IV wherein $R_{41}$ and $R_{42}$ are each independently selected from substituted or unsubstituted $C_{1-10}$ alkyl, wherein substituted means being substituted with one or more substituents selected from F, Cl or Br.

In some embodiments, $R_{41}$ and $R_{42}$ are each independently selected from the following groups that are substituted or unsubstituted: $C_{1-8}$ alkyl, $C_{1-6}$ alkyl or $C_{1-4}$ alkyl, wherein substituted means being substituted with one or more substituents selected from F, Cl or Br.

In some embodiments, $R_{41}$ and $R_{42}$ are each independently selected from methyl, ethyl, propyl, butyl, —$CF_2H$, —$CFH_2$, —$CF_3$, —$CF_2CH_3$, $CH_2CF_3$.

In some embodiments, $R_{41}$ is methyl.

In some embodiments, the compound of Formula IV includes at least one of the following: ethyl acetate, propyl acetate, ethyl difluoroacetate, ethyl trifluoroacetate, propyl acetate, butyl acetate, methyl propionate, ethyl propionate, ethyl isopropionate, propyl propionate, butyl propionate, isobutyl propionate, amyl propionate, isoamyl propionate, butyl butyrate, butyl isobutyrate, amyl butyrate, isoamyl butyrate, ethyl butyrate, ethyl valerate, ethyl isovalerate, ethyl isobutyrate, ethyl valerate, propyl valerate, propyl isovalerate or ethyl isovalerate.

In some embodiments, the compound of Formula IV includes at least one of

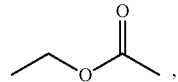

Formula IV-1

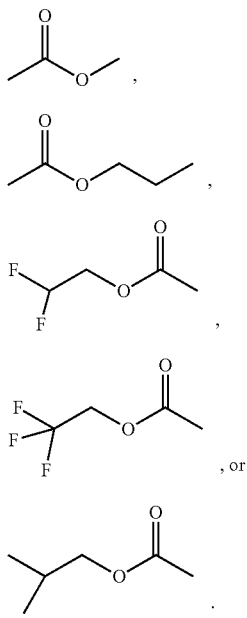

Formula IV-2

Formula IV-3

Formula IV-4

Formula IV-5

, or

Formula IV-6

In some embodiments, the compound of Formula IV is 5% to 50% based on the total weight of the electrolyte.

In some embodiments, the compound of Formula IV is about 10 to about 45% or about 15% to about 40% based on the total weight of the electrolyte. In some embodiments, the compound of Formula IV is about 10%, about 15%, about 20%, about 25%, about 30%, about 35%, about 40%, about 45% or about 50% based on the total weight of the electrolyte.

In some embodiments, the electrolyte further includes a lithium salt and a non-aqueous organic solvent.

In some embodiments, the lithium salt includes or is at least one of an organic lithium salt or an inorganic lithium salt. In some embodiments, the lithium salt useful in the present application contains at least one of fluorine element, boron element, and phosphorus element.

In some embodiments, the lithium salt includes or is at least one of the following: lithium hexafluorophosphate ($LiPF_6$), lithium tetrafluoroborate ($LiBF_4$), lithium bis(oxalato)borate ($LiB(C_2O_4)_2$, LiBOB), lithium difluoro(oxalato)borate ($LiBF_2(C_2O_4)$, LiDFOB), lithium hexafluoroantimonate ($LiSbF_6$), lithium hexafluoroarsenate ($LiAsF_6$), lithium perfluorobutylsulfonate ($LiC_4F_9SO_3$), lithium perchlorate ($LiClO_4$), lithium aluminate ($LiAlO_2$), lithium tetrachloroaluminate ($LiAlCl_4$), lithium bis(sulfonyl)imide ($LiN(C_xF_{2x+1}SO_2)(C_yF_{2y+1}SO_2)$, wherein x and y are natural numbers), lithium chloride (LiCl), lithium fluoride (LiI).

In some embodiments, the concentration of the lithium salt in the electrolyte of the present application is 0.5 mol/L to 3 mol/L, 0.5 mol/L to 2 mol/L, or 0.8 mol/L to 1.5 mol/L.

The non-aqueous organic solvent may include a carbonate solvent, a carboxylate solvent, an alkoxy solvent, a sulfone solvent, or other aprotic solvents. Examples of the carbonate solvent include dimethyl carbonate, diethyl carbonate, ethyl methyl carbonate, propyl methyl carbonate, propyl ethyl carbonate, dipropyl carbonate, ethylene carbonate, propylene carbonate, butylene carbonate, and so on. Examples of the carboxylate solvent include γ-butyrolactone, valerolactone, butyrolactone and the like. Examples of the alkoxy solvent include ethylene glycol dimethyl ether, diethylene glycol dimethyl ether, tetraethylene glycol dimethyl ether, dibutyl ether, tetrahydrofuran, 2-methyltetrahydrofuran and the like. Examples of the sulfone solvent include ethyl vinyl sulfone, methyl isopropyl sulfone, isopropyl sec-butyl sulfone, sulfolane and the like.

According to an embodiment of the present application, the non-aqueous organic solvent in the electrolyte may be a single non-aqueous organic solvent or a mixture of more than one non-aqueous organic solvents. When a mixed solvent is used, the mixing ratio may be controlled according to the desired performance of the electrochemical device.

In some embodiments, the solvent is 60% to 95% based on the weight of the electrolyte.

II. Electrochemical Device

The electrochemical device of the present application includes any device where an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application is an electrochemical device having a positive electrode having a positive electrode active material capable of absorbing and releasing metal ions; a negative electrode having a negative electrode active material capable of absorbing and releasing metal ions, and characterized by comprising any electrolyte of the present application.

In some embodiments, the electrochemical device includes a positive electrode, a negative electrode, a separator film, and any electrolyte as described above.

In some embodiments, the electrochemical device meets the requirement that $(R_b-R_a)/R_a$ is less than or equal to 1, wherein $R_a$ is the DC resistance when the electrochemical device is cycled 10 times at 25° C. in 20% charge state; and $R_b$ is the DC resistance when the electrochemical device is cycled 200 times at 25° C. in 20% charge state.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Negative Electrode

The negative electrode of the electrochemical device according to an embodiment of the present application includes a current collector and a negative electrode active material layer formed on the current collector. The negative electrode active material layer includes a negative electrode active material. The negative electrode active material can includes a material that reversibly intercalates/deintercalates lithium ions, lithium metal, lithium metal alloy, and a material or transition metal oxide capable of doping/dedoping lithium. The material that reversibly intercalates/deintercalates lithium ions may be a carbon material. The carbon material may be any carbon-based negative electrode active material commonly used in lithium ion rechargeable electrochemical devices. Examples of the carbon material include crystalline carbon, amorphous carbon, and combinations thereof. The crystalline carbon may be formless or plate-shaped, platelet-shaped, spherical or fibrous natural graphite or artificial graphite. The amorphous carbon may be soft carbon, hard carbon, carbonized mesophase pitch, calcined coke, and the like. Both low crystalline carbon and high crystalline carbon can be used as the carbon material. The low-crystalline carbon material generally includes soft carbon and hard carbon. The high-crystalline carbon material generally includes natural graphite, crystalline graphite, pyrolytic carbon, mesophase pitch-based carbon fiber, mesophase carbon microbeads, mesophase pitch and high-temperature calcined carbon (such as petroleum or coke derived from coal tar pitch).

The negative electrode active material layer includes a binder, and the binder may include, but is not limited to, various binder polymers, such as difluoroethylene-hexafluoropropylene copolymer (PVDF-co-HFP), polyvinylidene fluoride, polyacrylonitrile, polymethyl methacrylate, polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyethylene, polypropylene, styrene butadiene rubber, acrylated styrene butadiene rubber, epoxy resins, Nylon and so on.

The negative electrode active material layer also includes a conductive material to improve the conductivity of the negative electrode. Any conductive material can be used as the conductive material as long as it does not cause chemical changes. Examples of the conductive material include a carbon-based material, for example, natural graphite, artificial graphite, carbon black, acetylene black, ketjen black, and carbon fiber, etc.; a metal-based material, for example, a metal powder or metal fiber including copper, nickel, aluminum, silver, and so on; a conductive polymer, for example, a polyphenylene derivative; or a mixture thereof.

The lithium metal alloy includes lithium and at least one metal selected from Na, K, Rb, Cs, Fr, Be, Mg, Ca, Sr, Si, Sb, Pb, In, Zn, Ba, Ra, Ge, Al or Sn. Examples of the material capable of doping/dedoping lithium include Si, $SiO_x$ (0<x<2), Si—C composites, Si—Q alloys (wherein Q is an alkali metal, alkaline earth metal, elements from Group 13 to Group 16, transition elements, rare earth elements or a combination thereof, but not Si), Sn, $SnO_z$, Sn—C composites, Sn—R (wherein R is an alkali metal, alkaline earth metal, elements from Group 13 to Group 16, transition elements, rare earth elements or a combination thereof, but not Sn), and so on. Exemplary elements of Q and R include Mg, Ca, Sr, Ba, Ra, Sc, Y, Ti, Zr, Hf, Rf, V, Nb, Ta, Db, Cr, Mo, W, S g, Tc, Re, Bh, Fe, Pb, Ru, Os, Hs, Rh, Ir, Pd, Pt, Cu, A g, Au, Zn, Cd, B, Al, Ga, Sn, In, Tl, Ge, P, As, Sb, Bi, S, Se, Te, Po or a combination thereof. The transition metal oxide may be vanadium oxide, and lithium vanadium oxide, etc.

In some embodiments, the current collector includes, but is not limited to, copper foil, nickel foil, stainless steel foil, titanium foil, foamed nickel, foamed copper, polymeric substrates coated with a conductive metal, and any combinations thereof.

The negative electrode can be produced by a production method well known in the art. For example, the negative electrode can be obtained by mixing an active material, a conductive material and a binder in a solvent to prepare an active material composition, and coating the active material composition on a current collector.

Positive Electrode

In the electrochemical device according to the embodiments of the present application, the positive electrode includes a current collector and a positive electrode active material layer provided on the current collector.

In some embodiments, the positive electrode active material includes a compound that reversibly intercalates and deintercalates lithium ions (that is, a lithiated intercalation compound). The positive electrode active material may comprise a composite oxide which contains lithium and at least one element selected from cobalt, manganese, and nickel. Specifically, at least one of the following or a mixture of two or more of the following can be used: $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiMn_2O_4LiNi_{1-y}Co_yO_2$, $LiCo_{1-y}Mn_yO_2$, $LiNi_{1-y}Mn_yO_2$ (0<y<1), $Li(Ni_aMn_bCo_c)O_4$ (0<a<2, 0<b<2, 0<c<2, a+b+c=2), $LiMn_{2-z}Ni_zO_4$, $LiMn_{2-z}Co_zO_4$ (0<z<2), $Li(Ni_aCo_bAl_c)O_2$ (0<a<1, 0<b<1, 0<c<1, a+b+c=1), $LiCoPO_4$ and $LiFePO_4$. In addition to the above oxides, sulfides, selenides and halides can also be used.

In some embodiments, the compound may have a coating layer on the surface, or may be mixed with a compound having a coating layer. The coating can include at least one coating element compound selected from an oxide of a coating element, a hydroxide of a coating element, an oxyhydroxide of a coating element, an oxycarbonate of a coating element, and a hydroxyl carbonate of a coating element. The compound used for the coating may be amorphous or crystalline. The coating element contained in the coating may include Mg, Al, Co, K, Na, Ca, Si, Ti, V, Sn, Ge, Ga, B, As, Zr or a mixture thereof. The coating can be formed by any method as long as the properties of the positive electrode active material are not negatively affected because of the inclusion of the element in the compound. For example, the method may include any coating method known in the art, such as spraying, dipping, and others.

In some embodiments, the positive electrode active material layer may include a binder and a conductive material. The binder improves the binding performance between the positive electrode active material particles, and between the positive electrode active material particles and the current collector. Non-limiting examples of the binder include: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene butadiene rubber, acrylated styrene butadiene rubber, epoxy resins, Nylon and so on.

In some embodiments, the conductive materials are used to provide conductivity to the electrodes. The conductive material may include any conductive material as long as it does not cause a chemical change. Examples of the conductive material include one or a mixture of the following conductive material: for example, natural graphite; artificial graphite; carbon black; acetylene black; ketjen black; carbon fiber; a metal powder or a metal fiber, for example copper, nickel, aluminum, silver, and so on; or a polyphenylene derivative.

In some embodiments, the current collector may be, but is not limited to, aluminum.

The positive electrode can be prepared by a preparation method well known in the art. For example, the positive electrode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the positive electrode is prepared by forming a positive electrode material with a positive electrode active material layer including a lithium-transition metal compound powder and a binder on a current collector.

In some embodiments, the positive electrode active material layer can generally be produced by dry mixing a positive electrode material and a binder (and a conductive material and a thickener if needed) to form flakes, and pressing the obtained flakes on a positive electrode current collector; or dissolving or dispersing the material in a liquid medium to form a slurry, coating the slurry on a positive electrode current collector, and drying. In some embodiments, the material of the positive electrode active material layer includes any material known in the art.

In some embodiments, the porosity of the positive electrode is 8% to 22%. In some embodiments, the porosity of the positive electrode is 8% to 18%, 9% to 17%, 10% to 16%, or 12% to 14%. In some embodiments, the porosity of the positive electrode is about 10%, about 11%, about 12%, about 13%, about 14%, about 15%, about 16%, about 18%, about 20%, or about 22%.

Separator Film

In some embodiments, the electrochemical device of the present application is provided with a separator film between the positive electrode and the negative electrode to prevent short circuit. The material and shape of the separator film used in the electrochemical device of the present application are not particularly limited, and may be any of the techniques disclosed in the prior art. In some embodiments, the separator film includes a polymer or an inorganic substance or the like formed of a material which is stable against the electrolyte of the present application.

For example, the separator film may include a substrate layer and a surface treatment layer. The substrate layer is a non-woven fabric, film, or composite film having a porous structure, and the material of the substrate layer is at least one of polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is at least one of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyethylene oxide, polymethyl methacrylate, polytetrafluoroethylene, and polyhexafluoropropylene, or a combination of more than one thereof.

The polymer layer contains a polymer, and the material of the polymer is at least one selected from a polyamide, polyacrylonitrile, a polyacrylate ester, polyacrylic acid, a polyacrylate salt, polyvinylpyrrolidone, polyethylene oxide, polyvinylidene fluoride or poly(vinylidene fluoride-hexafluoropropylene).

In some embodiments, the separator film in the electrochemical device according to the embodiments of the present application includes a polyolefin microporous film and a coating. The coating includes an organic coating and an inorganic coating, wherein the organic coating is at least one of polyvinylidene fluoride, vinylidene fluoride-hexafluoropropylene copolymer, polyacrylonitrile, polyimide, acrylonitrile-butadiene copolymer, acrylonitrile-styrene-butadiene copolymer, polymethyl methacrylate, polymethyl acrylate, polyethyl acrylate, acrylic acid-styrene copolymer, polydimethylsiloxane, sodium polyacrylate, and sodium carboxymethyl cellulose; and the inorganic coating is one or more selected from $SiO_2$, $Al_2O_3$, $CaO$, $TiO_2$, $ZnO_2$, $MgO$, $ZrO_2$, and $SnO_2$. The polymer binder is selected from polyvinylidene fluoride.

According to the separator in the electrochemical device according to an embodiment of the present application, the separator film is selected from a single-layer or multi-layer polyolefin microporous film composed of at least one of polyethylene (PE), ethylene-propylene copolymer, polypropylene (PP), ethylene-butene copolymer, ethylene-hexene copolymer, and ethylene-methyl methacrylate copolymer.

III. Application

The electrolyte according to the embodiments of the present application can improve high-temperature cycle and storage performances and kinetic performance of the electrochemical device, and has a higher safety, so that the electrochemical device thus manufactured is suitable for use in electronic devices in various fields.

The use of the electrochemical device according to the present application is not particularly limited, and can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, Mini discs, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, or lithium ion capacitors.

IV. Examples

Hereinafter, the present application will be specifically described by way of examples and comparative examples; however, the present application is not limited thereto as long as they do not deviate from the spirit of the present application.

1. Preparation of Lithium-Ion Battery (1) Preparation of Negative Electrode:

Artificial graphite, styrene-butadiene rubber (SBR), and carboxymethylcellulose sodium (CMC) were dispersed at a weight ratio of 97.4:1.4:1.2 in a suitable amount of deionized water, and stirred fully to form uniform negative electrode slurry. The negative electrode slurry was applied to a copper foil which acts as current collector, dried, and cold pressed to obtain a negative electrode.

(2) Preparation of Positive Electrode:

The positive electrodes in Comparative Examples 1 to 6 and Examples 1 to 67 were prepared as follows.

A positive electrode active material lithium cobaltate ($LiCoO_2$), a conductive carbon black, a conductive paste, and a binder polyvinylidene fluoride (PVDF) were weighed at a weight ratio of 97.9:0.4:0.5:1.2 and dispersed in an appropriate amount of N-methylpyrrolidone (NMP) solvent, and mixed by fully stirring, to form a uniform positive electrode slurry. The slurry was coated onto an aluminum foil which acts as the current collector of the positive electrode, dried, and cold pressed to obtain the positive electrode. The rolling strength was set and the positive electrode porosity was adjusted to the range of 8-22%.

Preparation of Other Positive Electrodes:

In addition to the above method, other methods can also be used to prepare positive electrodes suitable for the technical solutions of the present invention. For example, the following method a or b can be used.

a. A positive electrode active material NCM811 ($LiNi_{0.8}Mn_{0.1}Co_{0.1}O_2$), a conductive agent acetylene black, and a binder polyvinylidene fluoride (PVDF) were dispersed at a weight ratio of 96:2:2 in a suitable amount of N-methylpyrrolidone (NMP) solvent, and mixed by fully stirring to form a uniform positive electrode slurry. The slurry was applied to an aluminum foil that acts as current collector, dried, and cold pressed to obtain the positive electrode.

b. A positive electrode active material NCM523 ($LiNi_{0.5}Mn_{0.3}Co_{0.2}O_2$), a conductive carbon black-L, a conductive paste and a binder polyvinylidene fluoride (PVDF) were dispersed at a weight ratio of 96:2:0.8:1.2 in a suitable amount of N-methylpyrrolidone (NMP) solvent, and mixed by fully stirring to form a uniform positive electrode slurry. The slurry was applied to an aluminum foil that acts as current collector, dried, and cold pressed to obtain the positive electrode.

(3) Preparation of Electrolyte

In a glove box under an argon atmosphere with a moisture content of <10 ppm, ethylene carbonate (EC), propylene carbonate (PC), and diethyl carbonate (DEC) were mixed uniformly at a weight ratio of 3:3:4. Then a fully dried lithium salt $LiPF_6$ was dissolved in the above non-aqueous solvent. Finally, an additive was added in a certain amount, to formulate an electrolyte. The types and amounts of the substances added are shown in the table below, and the contents of the substances are based on the total weight of the electrolyte. The concentration of $LiPF_6$ was 1 mol/L.

(4) Preparation of Separator Film

A 12 micron-thick polyethylene separator film was used.

(5) Preparation of Lithium-Ion Battery

The positive electrode, the separator film, and the negative electrode were positioned in order such that the separator film was placed between the positive electrode and the negative electrode to separate them. Then, the system was wound up to obtain a bare battery, and the bare battery was placed in a packaging foil. The electrolytic solution prepared above was injected into the dried battery. After vacuum packaging, standing, formation, shaping, and other procedures, a lithium ion battery was obtained.

2. Performance Test of Lithium Ion Battery (I) Cycle Performance Test

The lithium-ion battery was placed in a thermostat oven at 25° C., stood for 30 minutes to allow the lithium-ion battery to reach a constant temperature, charged to 4.45 V at a constant current of 0.7 C, then charged to 0.05 C at a constant voltage, and then discharged to 3.0V at 0.7 C. The capacity of this procedure was recorded as $C_0$. The procedure was conducted 1000 times. The capacity after 1000 cycles was recorded as $C_1$. The capacity retention rate was calculated.

Capacity retention rate after 1000 cycles=$C_1/C_0 \times 100\%$ (II) Low-Temperature Discharge Test The lithium ion battery was placed in a high and low temperature oven, and the temperature of the oven was adjusted to 25° C. The battery was stood for 5 minutes to allow the lithium ion battery to reach a constant temperature. The lithium ion battery reaching a constant temperature was charged to a voltage of 4.45V at a constant current of 0.5 C, then charged at a constant voltage of 4.45V until the current is 0.05 C, and then discharged to a voltage of 3.4V at a constant current of 0.2 C. The capacity of this procedure was recorded as $C_2$. The battery was charged to 4.45V at a constant current of 0.5 C at 25° C., and then charged to a current of 0.05 C at a constant voltage of 4.45V. The temperature of the oven was adjusted to −10° C., and the battery was allowed to stand in the oven for 60 minutes, and then discharged at a constant current of 0.2 C to a voltage of 3.4V. The discharge capacity $C_3$ at this time was recorded.

Discharge capacity retention rate at −10° C.=$C_3/C_2 \times 100\%$ (III) Direct Current Resistance (DCR) Test (at 0° C.)

1) The lithium ion battery was stood in a high and low temperature oven at 0° C. for 4 hours.

2) The battery was charged to 4.45V at a constant current of 0.1 C and then to cutoff current of 0.05 C at a constant voltage, and stood for 10 minutes.

3) The battery was discharged to 3.4V at 0.1 C and stood for 5 minutes (the actual capacity was obtained in this step).

4) After standing for 5 minutes, the battery was charged to 4.45V at a constant current of 0.1 C and then to a cut-off constant of 0.05 C (calculated with the actual capacity obtained in step 3) at a constant voltage.

5) The battery was stood for 10 minutes.

6) The battery was discharged at 0.1 C (calculated with the actual capacity obtained in step 3) for 8 hours, and the voltage at this time was recorded as $V_1$.

7) The battery was discharged at 1 C (wherein the capacity was calculated based on the labeled capacity of the battery) for 1 second, and the voltage at this time was recorded as $V_2$.

8) The DCR (in milliohms (mOhm)) corresponding to 20% state of charge (SOC) of the battery was calculated:

DCR at 20% SOC=$(V_1-V_2)/1C$ (IV) Expansion Rate During Storage at 85° C.

The lithium ion battery was discharged to 3.0V at 25° C. and 0.5 C, then charged to 4.45V at 0.7 C, and then charged to 0.05 C at a constant voltage of 4.45V. The thickness of the battery was measured using a microcalliper and recorded as $H_{11}$. The battery was placed in an oven at 85° C., and stood for 24 hours at a constant voltage of 4.45V. After 24 hours, the thickness of the battery was measured using a microcalliper and recorded as $H_{12}$.

Thickness expansion rate=$(H_{12}-H_{11})/H_{11} \times 100\%$

A. The Electrolytes and Lithium Ion Batteries of Examples 1 to 23 and Comparative Examples 1 to 6 were Prepared Following the Methods as Described Above. The Composition of the Electrolyte and the Test Results are Shown in Tables 1 and 2.

TABLE 1

| | Compound of Formula I | | | Additive A | |
| --- | --- | --- | --- | --- | --- |
| Example | Structural formula | Content (%) | FEC (%) | Lithium difluorophosphate (%) | |
| Comparative Example 1 | Compound I-2 | 0.3 | / | / | |
| Comparative Example 2 | Compound I-4 | 0.3 | / | / | |
| Comparative Example 3 | Compound I-7 | 0.3 | / | / | |
| Comparative Example 4 | Compound I-9 | 0.3 | / | / | |
| Comparative Example 5 | / | / | 3 | / | |
| Comparative Example 6 | / | / | / | 0.5 | |
| Example 1 | Compound I-2 | 0.05 | 10 | / | |
| Example 2 | Compound I-2 | 0.1 | 10 | / | |
| Example 3 | Compound I-2 | 0.3 | 10 | / | |
| Example 4 | Compound I-2 | 0.5 | 10 | / | |
| Example 5 | Compound I-2 | 0.9 | 10 | / | |
| Example 6 | Compound I-2 | 1 | 10 | / | |
| Example 7 | Compound I-2 | 0.5 | 5 | / | |
| Example 8 | Compound I-2 | 1.5 | 5 | / | |
| Example 9 | Compound I-2 | 2 | 5 | / | |
| Example 10 | Compound I-2 | 4 | 5 | / | |
| Example 11 | Compound I-2 | 0.3 | / | 0.01 | |
| Example 12 | Compound I-2 | 0.3 | / | 0.1 | |
| Example 13 | Compound I-2 | 0.3 | / | 0.3 | |
| Example 14 | Compound I-2 | 0.3 | / | 0.45 | |
| Example 15 | Compound I-2 | 0.3 | / | 0.6 | |
| Example 16 | Compound I-2 | 0.1 | 15 | 0.3 | |
| Example 17 | Compound I-2 | 0.3 | 3 | 0.5 | |
| Example 18 | Compound I-2 | 0.3 | 10 | 0.3 | |
| Example 19 | Compound I-4 | 0.3 | 5 | 0.45 | |
| Example 20 | Compound I-4 | 0.3 | 10 | / | |
| Example 21 | Compound I-7 | 0.3 | 10 | / | |
| Example 22 | Compound I-7 | 0.5 | 3 | 0.3 | |
| Example 23 | Compound I-9 | 0.3 | 7 | 0.9 | |

Note:
"/" denotes that the substance is not present. In Examples 1 to 23 and Comparative Examples 1 to 6, the porosity of positive electrode is 14%.

TABLE 2

| Example | Capacity retention rate after 1000 cycles at 25° C. | Discharge capacity retention rate at −10° C. | DCR at 0° C. (mOhm) |
| --- | --- | --- | --- |
| Comparative Example 1 | 72% | 52% | 140 |
| Comparative Example 2 | 71% | 52% | 140 |
| Comparative Example 3 | 71% | 52% | 140 |
| Comparative Example 4 | 72% | 52% | 140 |
| Comparative Example 5 | 73% | 48% | 146 |
| Comparative Example 6 | 57% | 52% | 139 |
| Example 1 | 78% | 48% | 136 |
| Example 2 | 79% | 52% | 136 |
| Example 3 | 82% | 55% | 136 |
| Example 4 | 81% | 55% | 134 |
| Example 5 | 81% | 55% | 134 |
| Example 6 | 78% | 54% | 135 |
| Example 7 | 81% | 54% | 134 |
| Example 8 | 78% | 53% | 135 |
| Example 9 | 77% | 53% | 135 |
| Example 10 | 75% | 52% | 135 |
| Example 11 | 74% | 55% | 134 |
| Example 12 | 76% | 56% | 132 |
| Example 13 | 77% | 57% | 131 |
| Example 14 | 74% | 56% | 132 |
| Example 15 | 73% | 57% | 131 |
| Example 16 | 80% | 57% | 138 |
| Example 17 | 82% | 55% | 131 |
| Example 18 | 85% | 57% | 129 |
| Example 19 | 84% | 57% | 131 |
| Example 20 | 79% | 55% | 134 |
| Example 21 | 78% | 55% | 134 |
| Example 22 | 81% | 54% | 135 |
| Example 23 | 82% | 57% | 130 |

It can be seen from Examples 1-23 and Comparative Examples 1-6 that when particular amounts of the compound of Formula I and the additive A are both added to the electrolyte, the cycle performance is improved while the low-temperature discharge capacity of the battery is effectively improved and the resistance is reduced, as compared with the situations where the compound of Formula I and the additive A are not added or only of them is added to the electrolyte.

B. The Electrolytes and Lithium Ion Batteries of Examples 3 and 24 to 36 were Prepared According to the Above Preparation Method. The Composition of the Electrolyte and the Test Results are Shown in Tables 3 and 4.

TABLE 3

| | Compound of Formula I | | Additive A | | Additive B | |
| --- | --- | --- | --- | --- | --- | --- |
| Example | Structural formula | Content (%) | FEC (%) | Lithium difluorophosphate (%) | Compound Formula II | Content (%) |
| Example 3 | Compound I-2 | 0.3 | / | / | / | / |
| Example 24 | Compound I-2 | 0.3 | 10 | / | Compound II-1 | 0.1 |
| Example 25 | Compound I-2 | 0.3 | 10 | / | Compound II-1 | 1 |
| Example 26 | Compound I-2 | 0.3 | 10 | / | Compound II-1 | 4 |
| Example 27 | Compound I-2 | 0.3 | 3 | / | Compound II-1 | 6 |
| Example 28 | Compound I-2 | 0.3 | 5 | / | Compound II-1 | 8 |
| Example 29 | Compound I-2 | 0.3 | 8 | / | Compound II-1 | 10 |
| Example 30 | Compound I-2 | 0.3 | / | 0.1 | Compound II-1 | 4 |
| Example 31 | Compound I-2 | 0.3 | / | 0.3 | Compound II-1 | 4 |
| Example 32 | Compound I-2 | 0.3 | / | 0.6 | Compound II-1 | 4 |
| Example 33 | Compound I-2 | 0.3 | 10 | 0.3 | Compound II-1 | 2 |

TABLE 3-continued

| | Additive A | | | | Additive B | |
| | Compound of Formula I | | | Lithium | | |
| Example | Structural formula | Content (%) | FEC (%) | difluorophosphate (%) | Compound Formula II | Content (%) |
|---|---|---|---|---|---|---|
| Example 34 | Compound I-7 | 0.3 | 10 | 0.3 | Compound II-4 | 2 |
| Example 35 | Compound I-7 | 0.3 | 10 | 0.3 | Compound II-2 | 6 |
| Example 36 | Compound I-9 | 0.3 | 10 | 0.3 | Compound II-3 | 4 |

Note:
"/" denotes that the substance is not present.
In Examples 20 to 36 and Comparative Examples 10 to 13, the porosity of positive electrode is 14%.

TABLE 4

| Example | Capacity retention rate after 1000 cycles at 25° C. | Expansion rate of battery during storage at 85° C. | DCR at 0° C. (mOhm) |
|---|---|---|---|
| Example 3 | 82% | 20% | 136 |
| Example 24 | 83% | 18% | 136 |
| Example 25 | 85% | 16% | 136 |
| Example 26 | 86% | 14% | 136 |
| Example 27 | 83% | 14% | 137 |
| Example 28 | 83% | 14% | 137 |
| Example 29 | 84% | 14% | 137 |
| Example 30 | 83% | 15% | 131 |
| Example 31 | 80% | 15% | 130 |
| Example 32 | 84% | 15% | 130 |
| Example 33 | 88% | 16% | 132 |
| Example 34 | 85% | 16% | 133 |
| Example 35 | 86% | 15% | 131 |
| Example 36 | 86% | 16% | 132 |

It can be seen from the examples in Table 3 and Table 4 that the further addition of the compound of Formula II (additive B) to the electrolyte containing the compound of Formula I and the additive A can improve the resistance and cycle performance of the battery, and meanwhile improve its high-temperature storage performance.

C. The electrolytes and lithium ion batteries of Examples 3 and Examples 37-50 were Prepared According to the Above Preparation Method. The Composition of the Electrolyte and the Test Results are Shown in Tables 5 and 6.

TABLE 5

| | Compound of Formula I | | | Additive A | Additive B | | Additive C | |
| | | | | Lithium | | | | |
| Example | Structural formula | Content (%) | FEC (%) | difluorophosphate (%) | Compound of Formula II | Content (%) | Compound of Formula III | Content (%) |
|---|---|---|---|---|---|---|---|---|
| Example 3 | Compd. I-2 | 0.3 | 10 | / | / | / | / | / |
| Example 37 | Compd. I-2 | 0.3 | 10 | / | / | / | Compd. III-2 | 0.1 |
| Example 38 | Compd. I-2 | 0.3 | 10 | / | / | / | Compd. III-2 | 3 |
| Example 39 | Compd. I-2 | 0.3 | 10 | / | / | / | Compd. III-2 | 5 |
| Example 40 | Compd. I-2 | 0.3 | 10 | / | / | / | Compd. III-2 | 9 |
| Example 41 | Compd. I-2 | 0.3 | 10 | / | / | / | Compd. III-2 | 15 |
| Example 42 | Compd. I-2 | 0.3 | 10 | / | / | / | Compd. III-2 | 20 |
| Example 43 | Compd. I-2 | 0.3 | / | 0.01 | / | / | Compd. III-2 | 0.1 |
| Example 44 | Compd. I-2 | 0.3 | / | 0.3 | / | / | Compd. III-2 | 5 |
| Example 45 | Compd. I-2 | 0.3 | / | 0.6 | / | / | Compd. III-2 | 5 |
| Example 46 | Compd. I-2 | 0.3 | 10 | 0.3 | Compd. II-1 | 2 | Compd. III-2 | 5 |
| Example 47 | Compd. I-2 | 0.3 | 10 | 0.3 | Compd. II-2 | 4 | Compd. III-2 | 3 |
| Example 48 | Compd. I-7 | 0.3 | 10 | 0.3 | Compd. II-4 | 2 | Compd. III-3 | 4 |
| Example 49 | Compd. I-7 | 0.3 | 10 | 0.3 | Compd. II-6 | 6 | Compd. III-4 | 6 |
| Example 50 | Compd. I-9 | 0.3 | 10 | 0.3 | Compd. II-7 | 4 | Compd. III-6 | 2 |

Note:
"/" denotes that the substance is not present.
In Examples 37 to 50, the porosity of positive electrode is 14%.

TABLE 6

| Example | Capacity retention rate after 1000 cycles at 25° C. | Expansion rate of battery during storage at 85° C. | DCR at 0° C. (mOhm) |
|---|---|---|---|
| Example 3 | 82% | 20% | 136 |
| Example 37 | 83% | 18% | 135 |
| Example 38 | 83% | 17% | 133 |
| Example 39 | 83% | 12% | 132 |
| Example 40 | 82% | 12% | 134 |
| Example 41 | 82% | 13% | 137 |
| Example 42 | 82% | 13% | 137 |
| Example 43 | 76% | 19% | 131 |
| Example 44 | 81% | 12% | 130 |
| Example 45 | 81% | 13% | 131 |
| Example 46 | 83% | 13% | 133 |
| Example 47 | 89% | 10% | 130 |
| Example 48 | 84% | 12% | 133 |
| Example 49 | 84% | 13% | 133 |
| Example 50 | 83% | 13% | 132 |

It can be seen from the examples in Table 5 and Table 6 that the further addition of the compound of Formula III (additive C) or the further addition of the compound of Formula II (additive B) and the compound of Formula III (additive C) to the electrolyte containing the compound of Formula I and the additive A can improve the high-temperature storage performance and the cycle performance of the battery, and reduce the resistance of the battery.

D. The Electrolytes and Lithium Ion Batteries of Examples 3 and Example 51-63 were Prepared According to the Above Preparation Method. The Composition of the Electrolyte and the Test Results are Shown in Tables 7 and 8.

TABLE 7

| Example | Compound of Formula I Structural formula | Compound of Formula I Content (%) | Additive A FEC (%) | Additive A LiPO$_2$F$_2$ (%) | Additive B Compound of Formula II | Additive B Content (%) | Additive C Compound of Formula III | Additive C Content (%) | Additive D Compound of Formula IV | Additive D Content (%) |
|---|---|---|---|---|---|---|---|---|---|---|
| Example 3 | Compd. I-2 | 0.3 | 10 | / | / | / | / | / | / | / |
| Example 51 | Compd. I-2 | 0.3 | 10 | / | / | / | / | / | Compd. IV-1 | 2 |
| Example 52 | Compd. I-2 | 0.3 | 10 | / | / | / | / | / | Compd. IV-2 | 5 |
| Example 53 | Compd. I-2 | 0.3 | 10 | / | / | / | / | / | Compd. IV-3 | 10 |
| Example 54 | Compd. I-2 | 0.3 | 10 | / | / | / | / | / | Compd. IV-1 | 15 |
| Example 55 | Compd. I-2 | 0.3 | 10 | / | / | / | / | / | Compd. IV-1 | 20 |
| Example 56 | Compd. I-2 | 0.3 | / | 0.3 | / | / | / | / | Compd. IV-1 | 10 |
| Example 57 | Compd. I-2 | 0.3 | 10 | 0.3 | Compd. II-1 | 2 | / | / | Compd. IV-1 | 10 |
| Example 58 | Compd. I-2 | 0.3 | 10 | 0.3 | Compd. II-1 | 4 | / | / | Compd. IV-1 | 12 |
| Example 59 | Compd. I-2 | 0.3 | 10 | 0.3 | Compd. II-2 | 2 | Compd. III-1 | 3 | Compd. IV-1 | 10 |
| Example 60 | Compd. I-2 | 0.3 | 10 | 0.3 | Compd. II-2 | 2 | Compd. III-2 | 3 | Compd. IV-2 | 10 |
| Example 61 | Compd. I-7 | 0.3 | 10 | 0.3 | Compd. II-4 | 2 | Compd. III-3 | 3 | Compd. IV-3 | 10 |
| Example 62 | Compd. I-7 | 0.3 | 10 | 0.3 | Compd. II-6 | 2 | Compd. III-4 | 3 | Compd. IV-4 | 10 |
| Example 63 | Compd. I-9 | 0.3 | 10 | 0.3 | Compd. II-7 | 2 | Compd. III-6 | 3 | Compd. IV-5 | 10 |

TABLE 8

| Example | Capacity retention rate after 1000 cycles at 25° C. | Expansion rate of battery during storage at 85° C. | DCR at 0° C. (mOhm) |
|---|---|---|---|
| Example 3 | 82% | 20% | 136 |
| Example 51 | 82% | 19% | 136 |
| Example 52 | 83% | 15% | 134 |
| Example 53 | 84% | 14% | 132 |
| Example 54 | 83% | 12% | 133 |
| Example 52 | 83% | 11% | 133 |
| Example 55 | 82% | 11% | 130 |
| Example 56 | 83% | 11% | 129 |
| Example 57 | 86% | 11% | 131 |
| Example 58 | 86% | 10% | 130 |
| Example 59 | 92% | 8% | 127 |
| Example 60 | 89% | 9% | 129 |
| Example 61 | 89% | 9% | 129 |
| Example 62 | 90% | 10% | 129 |
| Example 63 | 89% | 10% | 130 |

It can be seen from the examples in Table 7 and Table 8 that the further addition of the compound of Formula IV (additive D), or the further addition of the compound of Formula IV (additive D) and at least one of the compound of Formula II (additive B) or the compound of Formula III (additive C) to the electrolyte containing the compound of Formula I and the additive A, can improve the high-temperature storage performance and the cycle performance of the battery, and reduce the low-temperature resistance of the battery.

In summary, the above examples show that the electrolyte provided in the present invention can improve the low-temperature discharge performance, normal-temperature cycle performance, and high-temperature storage performance of electrochemical devices, and reduce the low-temperature resistance of electrochemical devices.

E. The Electrolytes and Lithium Ion Batteries of Examples 3, 18 and Examples 64-67 were Prepared According to the Above Preparation Method. The Positive Electrode Porosity, the Composition of the Electrolyte and the Test Results are Shown in Tables 9 and 10.

TABLE 9

| Example | Porosity of positive electrode | Compound of Formula I | | Additive A | |
| | | Structural formula | Content (%) | FEC (%) | Lithium difluorophosphate (%) |
| --- | --- | --- | --- | --- | --- |
| Example 3 | 14% | Compound I-2 | 0.3 | 10 | / |
| Example 64 | 18% | Compound I-2 | 0.3 | 10 | / |
| Example 65 | 20% | Compound I-2 | 0.3 | 10 | / |
| Example 66 | 22% | Compound I-2 | 0.3 | 10 | / |
| Example 18 | 14% | Compound I-2 | 0.3 | 10 | 0.3 |
| Example 67 | 18% | Compound I-2 | 0.3 | 10 | 0.3 |

TABLE 10

| Example | Capacity retention rate after 1000 cycles at 25° C. | Expansion rate of battery during storage at 85° C. | DCR at 0° C. (mOhm) |
| --- | --- | --- | --- |
| Example 3 | 82% | 20% | 136 |
| Example 64 | 80% | 22% | 136 |
| Example 65 | 79% | 22% | 136 |
| Example 66 | 74% | 30% | 135 |
| Example 18 | 85% | 17% | 129 |
| Example 67 | 82% | 20% | 130 |

It can be seen from the examples in Table 9 and Table 10 that by controlling the porosity of positive electrode within an appropriate range, the cycle performance and high-temperature storage performance of electrochemical devices can be further improved.

The foregoing descriptions are merely a few embodiments of the present application and are not intended to limit the present application in any manner. Although the present application is described with reference to preferred embodiments, the embodiments are not intended to limit the present application. According to the above disclosure, any change or modification of an embodiment above by persons skilled in the art without departing from the spirit, principle and scope of the present application should be regarded as practicing the embodiment.

Throughout the specification, references to "embodiment," "part of embodiments," "one embodiment," "another example," "example," "specific example" or "parts of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples. Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrolyte, comprising: a compound of Formula I and an additive A,

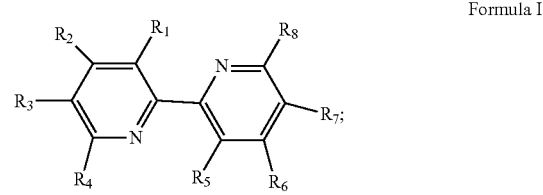

Formula I wherein, $R_1$, $R_2$, $R_3$, $R_4$, $R_5$, $R_6$, $R_7$ and $R_8$ are each independently selected from: hydrogen, halo, —COOX, substituted or unsubstituted $C_{1-8}$alkyl, substituted or unsubstituted $C_{2-10}$alkenyl, substituted or unsubstituted $C_{2-10}$alkynyl, substituted or unsubstituted $C_{1-8}$alkoxy, or —$R^a$—S$(=O)_2$—$R^b$, wherein $R^a$ is selected from substituted or unsubstituted $C_{1-8}$alkylene, Rb is selected from halo or substituted or unsubstituted $C_{1-8}$alkyl; and at least one of $R_1$, $R_2$, $R_3$, $R_4$, $R_5$, $R_6$, $R_7$ and $R_8$ is —COOX, wherein when substituted, the substituent is selected from cyano or halo; and X is selected from $Li^+$, $Na^+$, $K^+$ or $Rb^+$, wherein the additive A is at least one selected from fluoroethylene carbonate, $LiPO_2F_2$, or vinylene carbonate, wherein the electrolyte further comprises a compound of Formula III, the compound of Formula III is 0.1% to 20% based on a total weight of the electrolyte, and the compound of Formula III comprises at least one of:

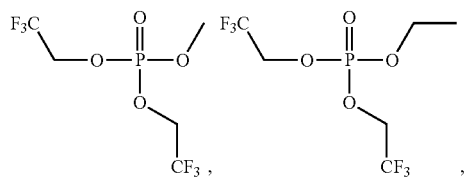

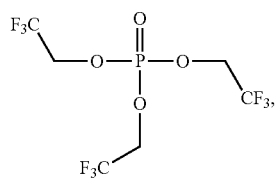

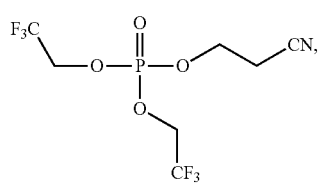

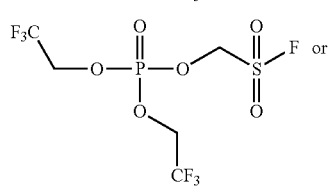

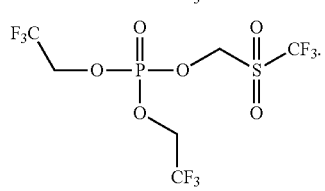

2. The electrolyte according to claim 1, wherein the compound of Formula I is at least one selected from:

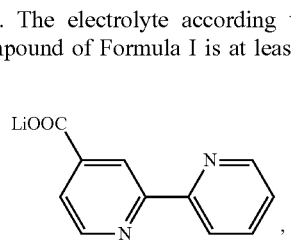

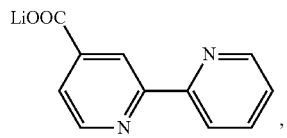

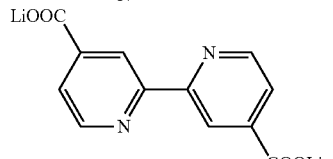

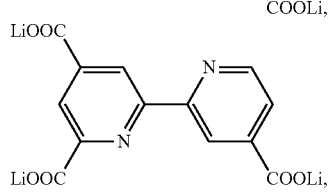

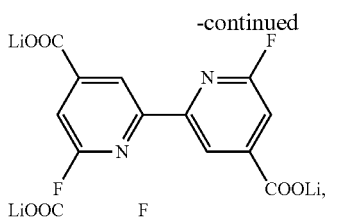

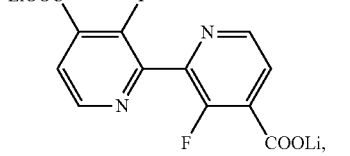

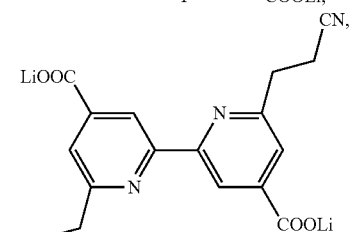

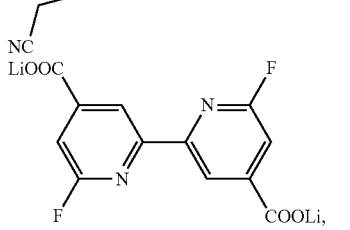

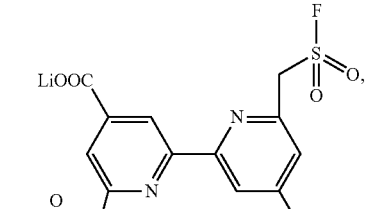

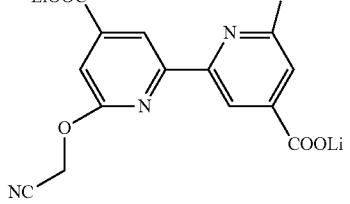

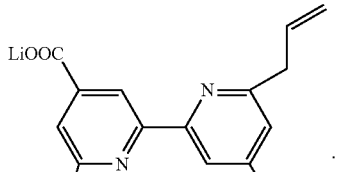

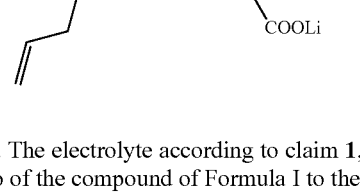

3. The electrolyte according to claim 1, wherein a weight ratio of the compound of Formula I to the additive A is 30:1 to 1:200.

4. The electrolyte according to claim 1, wherein the compound of Formula I is 0.05% to 5% based on a total weight of the electrolyte, and the additive A is 0.01% to 16% based on the total weight of the electrolyte.

5. The electrolyte according to claim 1, further comprising a compound of Formula II:

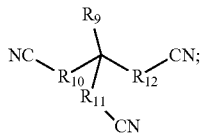

Formula II wherein,

R$_9$ is selected from hydrogen, cyano, halo, substituted or unsubstituted C$_{1-8}$ alkyl, or substituted or unsubstituted C$_{1-8}$ alkoxy;

R$_{10}$, R$_{11}$ and R$_{12}$ are each independently selected from a covalent bond, substituted or unsubstituted C$_{1-8}$ alkylene, or —O—R'—, wherein R' is substituted or unsubstituted C$_{1-8}$ alkylene, wherein when substituted, the substituent is selected from cyano or halo, wherein the compound of Formula II is 0.05% to 10% based on the total weight of the electrolyte.

6. The electrolyte according to claim 5, wherein the compound of Formula II comprises at least one of:

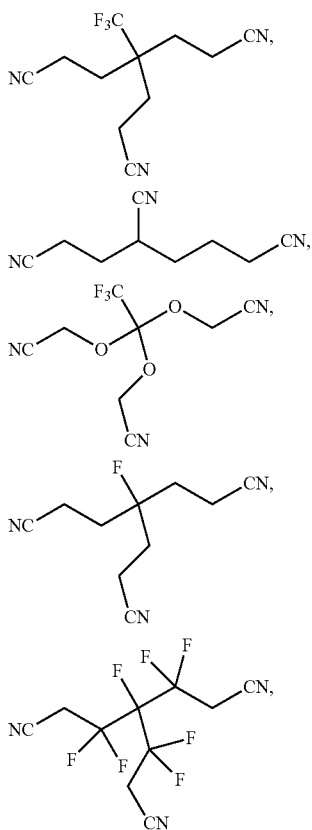

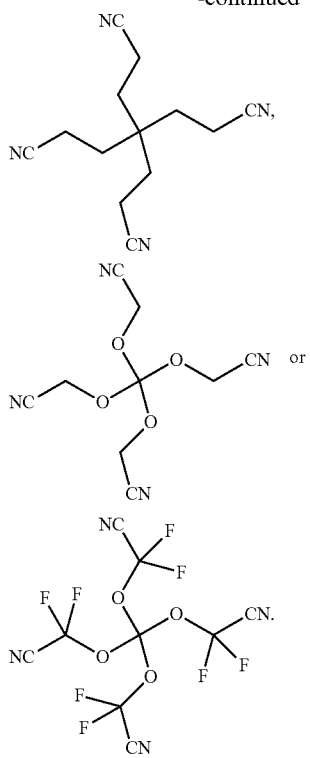

7. The electrolyte according to claim 1, further comprising a compound of Formula IV:

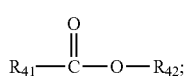

Formula IV wherein R$_{41}$ and R$_{42}$ are each independently selected from substituted or unsubstituted C$_{1-10}$ alkyl, wherein when substituted, they are substituted with one or more substituents selected from F, Cl or Br, wherein the compound of Formula IV is 5% to 50% based on the total weight of the electrolyte.

8. The electrolyte according to claim 7, wherein the compound of Formula IV comprises at least one of

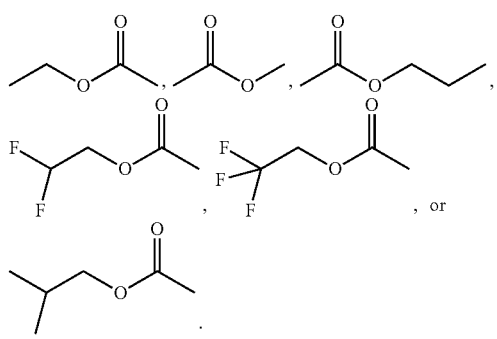

9. The electrolyte according to claim 5, further comprising a compound of Formula IV:

Formula IV

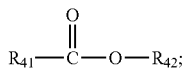

wherein $R_{41}$ and $R_{42}$ are each independently selected from substituted or unsubstituted $C_{1-10}$ alkyl, wherein when substituted, they are substituted with one or more substituents selected from F, Cl or Br, wherein the compound of Formula IV is 5% to 50% based on the total weight of the electrolyte.

10. The electrolyte according to claim 1, further comprising a compound of Formula IV:

Formula IV

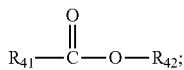

wherein $R_{41}$ and $R_{42}$ are each independently selected from substituted or unsubstituted $C_{1-10}$ alkyl, wherein when substituted, they are substituted with one or more substituents selected from F, Cl or Br, wherein the compound of Formula IV is 5% to 50% based on the total weight of the electrolyte.

11. The electrolyte according to claim 1, further comprising a compound of Formula II:

Formula II

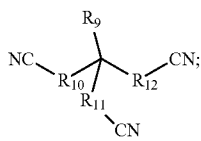

wherein:
$R_9$ is selected from hydrogen, cyano, halo, substituted or unsubstituted $C_{1-8}$ alkyl, or substituted or unsubstituted $C_{1-8}$ alkoxy;
$R_{10}$, $R_{11}$ and $R_{12}$ are each independently selected from a covalent bond, substituted or unsubstituted $C_{1-8}$ alkylene, or —O—R'—, wherein R' is substituted or unsubstituted $C_{1-8}$ alkylene,
wherein when substituted, the substituent is selected from cyano or halo,
wherein the compound of Formula II is 0.05% to 10% based on the total weight of the electrolyte.

12. An electrochemical device, comprising a positive electrode, a negative electrode, and an electrolyte, wherein the electrolyte comprises a compound of Formula I and an additive A, Formula I

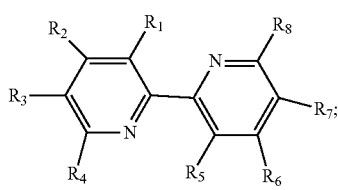

wherein:
$R_1$, $R_2$, $R_3$, $R_4$, $R_5$, $R_6$, $R_7$ and $R_8$ are each independently selected from: hydrogen, halo, —COOX, substituted or unsubstituted $C_{1-8}$alkyl, substituted or unsubstituted $C_{2-10}$alkenyl, substituted or unsubstituted $C_{2-10}$alkynyl, substituted or unsubstituted $C_{1-8}$alkoxy, or —$R^a$—S(=O)$_2$—$R^b$, wherein $R^a$ is selected from substituted or unsubstituted $C_{1-8}$ alkylene, $R^b$ is selected from halo or substituted or unsubstituted $C_{1-8}$alkyl, and at least one of $R_1$, $R_2$, $R_3$, $R_4$, $R_5$, $R_6$, $R_7$ and $R_8$ is —COOX, wherein when substituted, the substituent is selected from cyano or halo; and X is selected from Li$^+$, Na$^+$, K$^+$ or Rb$^+$, wherein the additive A is at least one selected from fluoroethylene carbonate, LiPO$_2$F$_2$, or vinylene carbonate, wherein the electrolyte further comprises a compound of Formula III, the compound of Formula III is 0.1% to 20% based on a total weight of the electrolyte, and the compound of Formula III comprises at least one of:

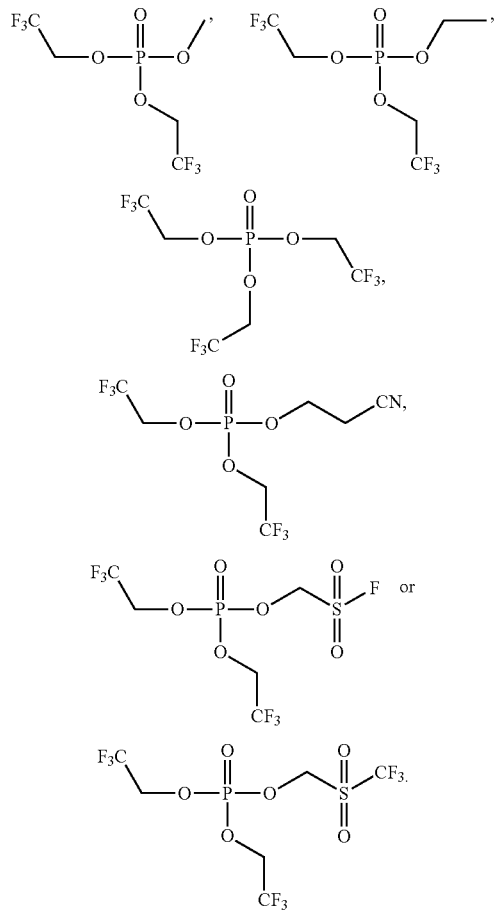

13. The electrochemical device according to claim 12, wherein the electrolyte further comprises a compound of Formula II:

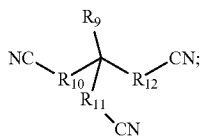

Formula II wherein:
R$_9$ is selected from hydrogen, cyano, halo, substituted or unsubstituted C$_{1-8}$ alkyl, or substituted or unsubstituted C$_{1-8}$ alkoxy;
R$_{10}$, R$_{11}$ and R$_{12}$ are each independently selected from a covalent bond, substituted or unsubstituted C$_{1-8}$ alkylene, or —O—R'—, wherein R' is substituted or unsubstituted C$_{1-8}$ alkylene,
wherein when substituted, the substituent is selected from cyano or halo,
wherein the compound of Formula II is 0.05% to 10% based on the total weight of the electrolyte.

14. The electrochemical device according to claim 12, wherein the electrolyte further comprises a compound of Formula IV:

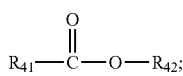

Formula IV wherein R$_{41}$ and R$_{42}$ are each independently selected from substituted or unsubstituted C$_{1-10}$ alkyl, wherein when substituted, they are substituted with one or more substituents selected from F, Cl or Br, wherein the compound of Formula IV is 5% to 50% based on the total weight of the electrolyte.

15. The electrochemical device according to claim 12, wherein the weight ratio of the compound of Formula I to the additive A is 30:1 to 1:200.

16. An electronic device, comprising an electrochemical device, wherein the electrochemical device comprises a positive electrode, a negative electrode, and an electrolyte, wherein
the electrolyte comprises a compound of Formula I and an additive A,

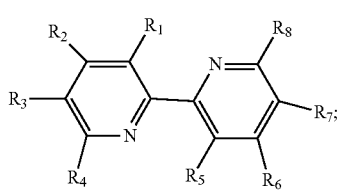

Formula I wherein:
R$_1$, R$_2$, R$_3$, R$_4$, R$_5$, R$_6$, R$_7$ and R$_8$ are each independently selected from: hydrogen, halo, —COOX, substituted or unsubstituted C$_{1-8}$alkyl, substituted or unsubstituted C$_{2-10}$alkenyl, substituted or unsubstituted C$_{2-10}$alkynyl, substituted or unsubstituted C$_{1-8}$alkoxy, or —R$^a$—S(=O)$_2$—R$^b$, wherein R$^a$ is selected from substituted or unsubstituted C$_{1-8}$ alkylene, R$^b$ is selected from halo or substituted or unsubstituted C$_{1-8}$alkyl, and at least one of R$_1$, R$_2$, R$_3$, R$_4$, R$_5$, R$_6$, R$_7$ and R$_8$ is —COOX, wherein when substituted, the substituent is selected from cyano or halo; and
X is selected from Li$^+$, Na$^+$, K$^+$ or Rb$^+$,
wherein the additive A is at least one selected from fluoroethylene carbonate, LiPO$_2$F$_2$, or vinylene carbonate,
wherein the electrolyte further comprises a compound of Formula III,
the compound of Formula III is 0.1% to 20% based on a total weight of the electrolyte, and
the compound of Formula III comprises at least one of:

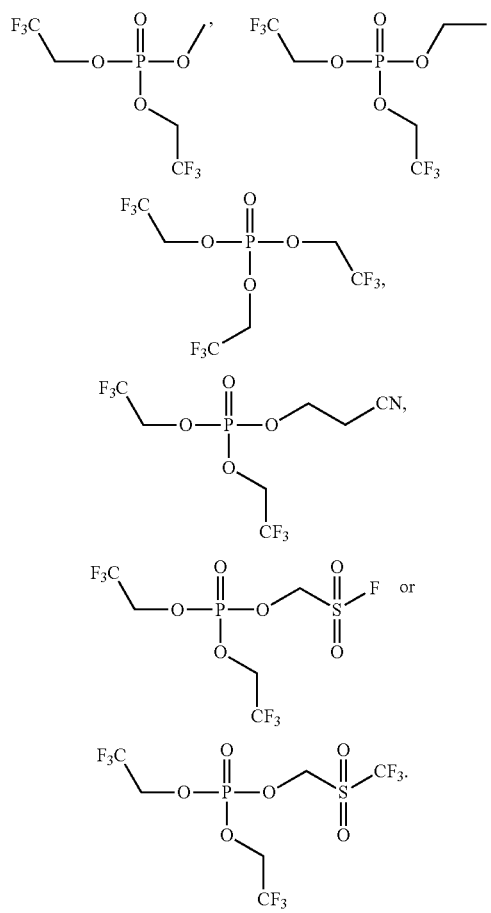

17. The electrochemical device according to claim 13, wherein the compound of Formula II comprises at least one of:

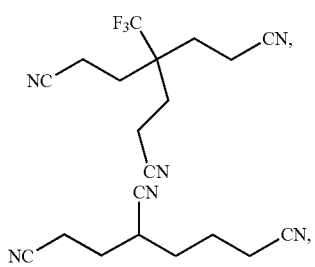

-continued
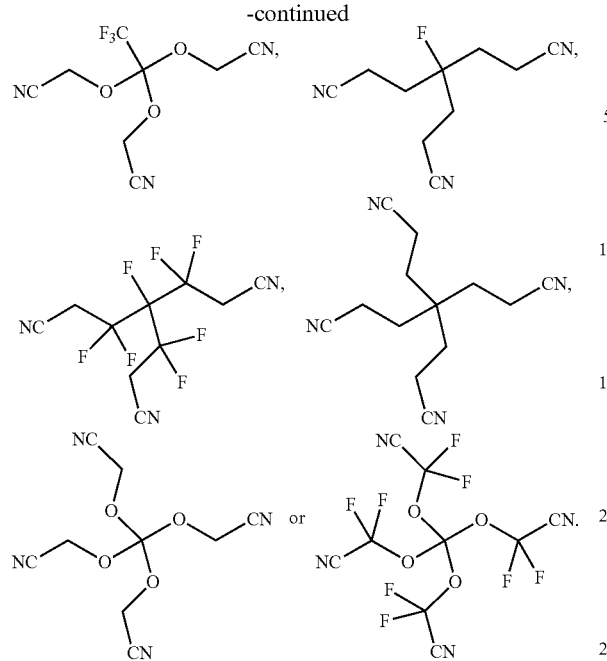
18. The electrochemical device according to claim 14, wherein the compound of Formula IV comprises at least one of
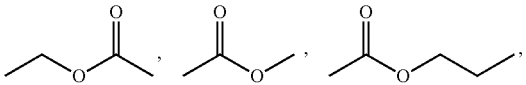
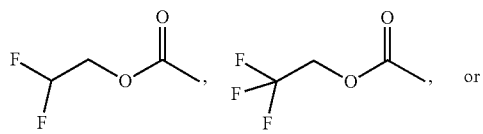 or
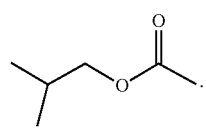
* * * * *